3,136,644
REGENERATED CELLULOSE SHAPED ARTICLES AND PROCESS
William James Pangonis, West Chester, Pa., assignor to E. I. du Pont de Nemours and Company, Wilmington, Del., a corporation of Delaware
No Drawing. Filed Feb. 27, 1962, Ser. No. 176,097
6 Claims. (Cl. 106—168)

This invention relates to regenerated cellulose structures, and more particularly to improved film of regenerated cellulose and to a process for preparing the same.

An object of this invention is to provide a process for producing regenerated cellulose structures having generally improved physical properties. Another object is to provide a process for improving the physical properties of regenerated cellulose structures derived from viscose. A more specific object is to provide for the production of regenerated cellulose film having reduced water-sensitivity, improved wet strength, improved impact strength and tear resistance, increased modulus, and good flexibility characteristic of softened film. A still further object is to provide film and like structures of regenerated cellulosic material derived from viscose, said structures being characterized by a generally enhanced level of physical properties. These and other objects will more clearly appear from the detailed description which follows.

The foregoing and related objects are realized by the present invention which, briefly stated, comprises uniformly dispersing in viscose from 1% to 22% by weight, based on the weight of cellulose in the viscose, of fibrous alumina monohydrate substantially in the form of fibrils having at least one dimension in the colloidal range and having a boehmite crystal lattice, and which has been surface modified (partially esterified) by reaction with a compound from the group consisting of polyhydric alcohols and polyglycols, and thereafter coagulating and regenerating said mixture in conventional manner in the form of a shaped structure, e.g., a film of regenerated cellulose having uniformly distributed therethrough from 1% to 22% by weight, based on the weight of cellulose in the film, of modified fibrous alumina monohydrate chemically bonded to the cellulose.

Fibrous alumina monohydrate useful for purposes of this invention is that described and claimed in copending application Serial No. 594,265 (Bugosh), filed June 27, 1956, now abandoned. This material is characterized chiefly by its physical form which is one of sharply defined fibrils, each fibril being substantially uniform in diameter, the diameter being less than 150 millimicrons and preferably within the range of from about 2 to about 100 millimicrons. The fibrils have an average length of at least 350 millimicrons and an axial ratio (i.e., the ratio of the length of the fibril to its diameter) greater than 20:1. Fibrous alumina monohydrate in a sol is further characterized by having a boehmite crystal lattice, i.e., having the X-ray diffraction pattern of naturally occurring boehmite which is that shown in ASTM diffraction pattern card 2–0129.

Additional fibrous alumina monohydrate useful for purposes of this invention is described and claimed in U.S. Patent 2,915,475, issued December 1, 1959, in the name of J. Bugosh. This patent is a continuation-in-part of the above-mentioned abandoned application.

This material has the boehmite crystal lattice and made up of alumina fibrils having an average length of 100 to 1500 millimicrons, and having an axial ratio greater than 20:1. Preferred fibrils have an average length of 100 to 700 millimicrons.

A redispersible, pulverant fibrous alumina monohydrate is also useful in this invention. These products, which have been dried from aqueous systems, tend to have shorter fibrils than the sols from which they were made. The material is characterized by the boehmite crystal lattice and made up of alumina fibrils having an average length of 25 to 1500 millimicrons, and having an axial ratio ranging from 3.76:1 to 451:1. Preferred pulverant materials have an average length of 50 to 700 millimicrons.

Sols of fibrous alumina hydrate are further characterized by the specific surface area of the alumina monohydrate fibrils present in the dispersion, which is within the range of from 100 to 350 square meters per gram. The specific surface area of the fibrils is determined by drying the colloidal alumina monohydrate in such a way as to prevent aggregation, i.e., compacting of the fibrils, as described in the aforementioned application Serial No. 594,265, and thereafter measuring the specific surface area of the dried alumina monohydrate by the method of P. H. Emmett, "A New Method for Measuring the Surface Area of Finely Divided Materials and for Determining the Size of Particles," Symposium of New Methods for Particle Size Determination in the Sub-Sieve Range, p. 95, published by the American Society for Testing Materials, March 4, 1941.

A typical method for preparing fibrous alumina monohydrate suitable for purposes of this invention is as follows:

An alumina gel is precipitated by simultaneously metering an alum solution containing 1 part by weight of $Al_2(SO_4)_3 \cdot 18H_2O$ and 2 parts distilled water and a sodium carbonate solution containing 1 part $Na_2CO_3$ and 4 parts distilled water into the agitated reaction mass in an open tank. The reactant ratio, $CO_2/Al$, is maintained at $1.67 \pm 0.02$ (molar basis) at all times during the precipitation. After precipitation, the gel slurry is transferred to a filter nutsche and filtered using vacuum. The filter cake is washed on the nutsche using nine successive washes of distilled water at 70° C. Each wash volume is approximately equivalent to the volume of the filter cake. Thirty-eight parts of washed cake are transferred to a stirred kettle and mixed with 10.2 parts distilled water. This mixture is homogenized by pumping it through a centrifugal pump four times. This homogenized slurry analyzes as:

| | |
|---|---|
| Percent $Al_2O_3$ | 7.94 |
| Percent Na | 0.010 |
| Percent $SO_4$ | 0.054 |
| Na/Al | 0.0028 |
| $SO_4$/Al | 0.0036 |

2,200 parts of this slurry are aged for 24 hours at 25° C. and are then mixed with 1218 parts of distilled water and 82.4 parts of glacial acetic acid. This mixture is placed in a flask equipped with a paddle agitator and heated to boiling (100° C.) and held at reflux for 5 minutes to drive off carbon dioxide. This reaction mix is then transferred to a stainless steel autoclave equipped with an agitator and heated to 160° C. in a period of 24 minutes. Temperature is maintained at 160° C. for one hour and then the charge is cooled to 70° C. in 10 minutes and discharged from the autoclave. This material, consisting of 3.5 kg. of product, is a translucent, fluid sol of the following analysis:

| | |
|---|---|
| Percent $Al_2O_3$ | 4.96. |
| Percent $CH_3COOH$ | 2.40. |
| A.N. | 301 $M^2$/g. |
| $L_f$ [1] | 279 m$\mu$. |

[1] Average particle length as determined by streaming birefringence.

By the expression "polyhydric alcohols" as used herein is meant compounds having the general structural formula $R(OH)_n$ wherein R is an aliphatic hydrocarbon radical, and n is an integer of at least 2. By the term "polyglycols" is meant dihydroxypolyethers with hydroxyl groups on the terminal hydrocarbon radicals. These may be represented by the general formula $$H(OR)_nOH$$

wherein R is a divalent aliphatic hydrocarbon radical, and n is an integer of at least 2. As representative compounds from the class consisting of polyhydric alcohols and polyglycols there may be mentioned glycerol, ethylene glycol, 1,2-propanediol, 1,3-propanediol, 1,4-butanediol, propylene glycol, 1,2,6-hexanetriol, 1,2,4-hexanetriol, sorbitol, triethylene glycol, and polyethylene glycols having molecular weights of 200–1000.

Modification of fibrous alumina monohydrate is achieved for purposes of this invention by treating the alumina monohydrate fibrils with the polyhydric alcohol or polyglycol under conditions such that the fibrils become partially esterified, i.e., by reaction at the surface of the fibrils. For example, fibrous alumina monohydrate may be modified with glycerol in the following manner: Redispersible fibrous alumina monohydrate (boehmite) particle powder is added to water with agitation until an 8–10% dispersion is achieved. The dispersion is then added to heated glycerol (80° C.) under slight vacuum and evaporation distillation is continued until the water is removed. When the dispersion in glycerol is carried out at this temperature, the alumina monohydrate fibrils become partially esterified. This esterification is a surface effect. The resulting dispersion is preferably adjusted to approximately 8½% solids by weight, based on the total weight of the dispersion.

The modified fibrous alumina monohydrate may be incorporated in the viscose by any convenient mixing expedient effective to produce a substantially homogeneous (uniform) admixture of the two constituents. Preferably, mixing is accomplished at a low to moderate mixer speed with a low to moderate rate of shear. While the amount of modified fibrous alumina monohydrate incorporated in the viscose may vary from as little as 1% to as much as 22% by weight, based on the total weight of the mixture, for optimum properties in the regenerated cellulose structures produced it is preferred to use from 8–10% of modified fibrous alumina monohydrate.

The viscose and modified fibrous alumina monohydrate system is ripened and deaerated as conventional viscose processes, and when the viscose is otherwise properly conditioned, the viscose dispersion is extruded, in conventional viscose extrusion equipment, into the usual coagulating/regenerating bath system from which it is finally obtained in desired shaped structure, e.g., in the form of a continuous cellulosic film, which is customarily led in a continuous manner through a series of purifying, bleaching, washing and drying operations, as described in Brandenberger, U.S. Patent 1,548,864. Just prior to the drying step, the film may be passed through a bath containing an anchoring agent (if the film is to be coated) and/or softening agent in such concentration that after the excess liquid has been removed from the surface of the film by suitable squeeze rolls and the excess moisture has been removed in the dryer, a film containing, in addition to the modified fibrous alumina monohydrate, an appropriate predetermined amount of anchoring agent and/or softening agent will result.

The present invention is applicable to the production of cellulosic articles of any shape, regenerated from viscose, with or without the additions of plasticizers, softeners, dyes, pigments, fillers and sizes, etc. The shaped article produced according to this invention may, of course, be coated, printed, laminated, etc., by the expedients, and using the materials heretofore employed in the art.

The following examples will serve to further illustrate the principles and practice of this invention. Parts and percentages are by weight unless otherwise indicated.

EXAMPLE I 25 parts of redispersible fibrous alumina monohydrate (boehmite) particle powder was slowly added to 250 parts of water with agitation until a dispersion was achieved. This dispersion was then added to 270 parts of glycerol, heated to approximately 80° C. under slight vacuum, and evaporation distillation was continued until the water was removed. The reaction was considered to be substantially complete after approximately 60 minutes and was evidenced by an increase in viscosity and by a color change from a bluish opalescence to a bluish yellow opalescence. Carrying out the reaction under these conditions results in partial esterification, i.e. the alumina monohydrate particles (fibrils) were esterified at the surface. The dispersion was adjusted to 8.5% by weight of solids.

10 parts of the glycerol modified fibrous alumina monohydrate, dispersed as above described, was added at 23° C. to 90 parts of viscose (8.5% by weight of cellulose and 6.5% caustic soda), having a degree of polymerization (D.P.) of 200 and a salt index (S.I.) of 6.0 and mixed for 30 minutes at 1200 r.p.m. with a paddle-type mixer. The viscose was deaerated, cast onto a glass plate with a doctor knife having a 15 mil opening, regenerated in a 12% $H_2SO_4$–$Na_2SO_4$ bath, washed in hot water (70° C.), immersed in a 5% glycerol softening bath so that the resulting dried film contained 8% softener, clamped on a ferro-type plate and dried at room temperature for approximately 4 hours. This sample was identified as sample A.

A control film of regenerated cellulose was processed in the manner similar to that described above, omitting the addition of the glycerol-modified fibrous alumina monohydrate.

An additional sample (B) and control were run, but with no softener added to the films. Samples of the treated film and control film were each conditioned to 50% relative humidity (R.H.) and 23° C. for 24 hours. The samples of the film were tested as follows:

*Initial tensile modulus.*—Initial tensile modulus is a measure of film stiffness, i.e., the higher the modulus the greater the stiffness. Modulus is taken from the slope of the initial or Hookeian portion of the stress-strain curve at 1% elongation, the film being elongated at the rate of 100% per minute.

*Elongation.*—The value of elongation represents the extent to which the film was extended at breakage. The film is stretched at the rate of 100% per minute.

*Tensile strength.*—The tensile strength of the film structures is based upon the initial cross-sectional area of the film test sample. Tensile strength at break was determined by elongating the film sample at the rate of 100% per minute until the film sample broke.

*Pneumatic impact strength.*—Pneumatic impact strength is the energy required to rupture the film. It is reported in kilogram-centimeters/mil of thickness of the film sample. Pneumatic impact strength was determined by measuring the velocity of a ball mechanically accelerated by air pressure, first in free flight and then in a flight impeded by rupturing the test film sample. In this test, the film sample was 1¾" x 1¾". The projectiles were steel balls ½" in diameter and weighing 8.3 grams. The velocities were measured by timing photoelectrically the passage of the steel balls between two light beams set a definite distance apart. The pneumatic impact strength was measured by the loss in kinetic energy due to the rupturing of the film sample. It is calculated from the following formula:

Constant × (square of velocity in free flight minus square of velocity in impeded flight)

where the constant is directly proportional to the weight of the projectile and inversely proportional to the acceleration due to gravity. This test was measured at 23° C. and 50% relative humidity, and the test samples were conditioned for 24 hours at 23° C. and 50% relative humidity.

*Wet-strength properties.*—The wet-strengths of the films were tested in Instron apparatus The individual samples were clamped in an Instron tank so that they were completely immersed in water. The samples were submerged for 2 minutes to allow complete rewetting. Testing then proceeded in the usual Instron method.

The results of these tests are set forth in Table I.

Table I

| | Percent Fibrous Alumina Monohydrate (wt.) | Percent Softener (wt.) | Initial Tensile Modulus (p.s.i.) | Elongation (percent) | Tensile Strength (p.s.i.) | Impact (kg.-cm./mil) |
|---|---|---|---|---|---|---|
| Control | 0 | 8 | 525,000 | 26.2 | 12,100 | 3.25 |
| Sample A | 10 | 8 | 719,000 | 26.9 | 14,400 | 3.38 |
| Control | 0 | 0 | 885,000 | 12.0 | 16,400 | 1.85 |
| Sample B | 10 | 0 | 1,015,000 | 13.9 | 17,800 | 2.20 |
| Wet-Strength Properties: | | | | | | |
| Control | 0 | 0 | 13,875 | 48.0 | 5,100 | |
| Sample B | 10 | 0 | 23,900 | 33.0 | 7,800 | |

Infra-red spectra analysis of A and B indicates chemical bonding of the alumina monohydrate to the cellulosic structure.

EXAMPLE II

Viscose, as in Example I, was modified by adding the following components into the viscose with mixing at a moderate rate of shear:

Percent additive to viscose

A—Eethylene glycol (3.5% F.A.M.) _____ 6.0
B—Ethylene glycol (3.5% F.A.M.) _____ 10.2
C—Ethylene glycol (6.5% F.A.M.) _____ 8.0
D—Propanediol-1,3 (4.4% F.A.M.) _____ 10.0

Films of the above systems were cast and processed in a manner similar to that described in Example I and had appearances equal to that of the control. Properties of the films were as follows:

| System | Percent F.A.M. | Modulus | Elongation | Tenacity | Impact |
|---|---|---|---|---|---|
| A | 2.6 | 925,000 | 17.5 | 17,500 | 2.20 |
| B | 4.5 | 950,000 | 17.2 | 17,800 | 2.05 |
| C | 6.5 | 1,015,000 | 19.2 | 19,500 | 2.15 |
| Control | 0 | 885,000 | 12.0 | 16,490 | 1.85 |

It is apparent from the foregoing description and examples that the addition of the modified fibrous alumina monohydrate to the viscose yields, particularly in the case of regenerated cellulose films produced from the mixture, significant and unexpected improvements in the physical properties of the shaped product. Increased moduls or stiffness of the resulting films with retention of flexibility, in particular, was not to be expected, since, normally if reinforcing agents are added to the film-forming composition, the reinforced films are stiffened but embrittled. As evidenced by infra-red spectra analysis, the surface-modified fibrous alumina monohydrate appears to be chemically bound into the regenerated cellulose shaped articles upon regeneration and apparently functions as a permanent plasticizer.

This application is a continuation-in-part of my co-pending application Serial No. 8,212 filed on February 12, 1960, now abandoned.

What is claimed is:

1. In the process of producing regenerated cellulose shaped articles from viscose the improvement which comprises uniformly incorporating in the viscose from which the shaped articles of regenerated cellulose are produced from 1% to 22% by weight of fibrous alumina monohydrate substantially in the form of fibrils having at least one dimension in the colloidal range and having a boehmite crystal lattice structure, said fibrils having an average length of at least 350 millimicrons and an axial ratio greater than 20:1 and which has been partially esterified by reaction with a compound from the group consisting of polyhydric alcohols and polyglycols.

2. In the process of producing regenerated cellulose film from viscose the improvement which comprises uniformly incorporating in the viscose from which the film of regenerated cellulose is produced from 1% to 22% by weight of fibrous alumina monohydrate substantially in the form of fibrils having at least one dimension in the colloidal range and having a boehmite crystal lattice structure, said fibrils having an average length of at least 350 millimicrons and an axial ratio greater than 20:1 and which has been partially esterified by reaction with a compound from the group consisting of polyhydric alcohols and polyglycols.

3. In the process of producing regenerated cellulose shaped articles from viscose the improvement which comprises uniformly incorporating in the viscose from which the shaped articles of regenerated cellulose are produced from 1% to 22% by weight of fibrous alumina monohydrate substantially in the form of fibrils having at least one dimension in the colloidal range and having a boehmite crystal lattice structure, said fibrils having an average length of 100 to 1500 millimicrons and an axial ratio greater than 20:1 and which has been partially esterified by reaction with a compound from the group consisting of polyhydric alcohols and polyglycols.

4. In the process of producing regenerated cellulose film from viscose the improvement which comprises uniformly incorporating in the viscose from which the film of regenerated cellulose is produced from 1% to 22% by weight of fibrous alumina monohydrate substantially in the form of fibrils having at least one dimension in the colloidal range and having a boehmite crystal lattice structure, said fibrils having an average length of 100 to 1500 millimicrons and an axial ratio greater than 20:1 and which has been partially esterified by reaction with a compound from the group consisting of polyhydric alcohols and polyglycols.

5. In the process of producing regenerated cellulose shaped articles from viscose the improvement which comprises uniformly incorporating in the viscose from which the shaped articles of regenerated cellulose are produced from 1% to 22% by weight of redispersible, pulverant fibrous alumina monohydrate substantially in the form of fibrils having a boehmite crystal lattice structure, said fibrils having an average length of 25 to 1500 millimicrons and an axial ratio ranging from 3.76:1 to 451:1 and which has been partially esterified by reaction with a compound from the group consisting of polyhydric alcohols and polyglycols.

6. Shaped structures of regenerated cellulose produced by the process of claim 5.

References Cited in the file of this patent

UNITED STATES PATENTS 2,915,475    Bugosh _____ Dec. 1, 1959